United States Patent [19]
Yoshino

[11] Patent Number: 5,843,205
[45] Date of Patent: Dec. 1, 1998

[54] METHOD OF REMOVING DIOXINS IN A WASTE INCINERATION PLANT

[75] Inventor: Eiichi Yoshino, Fukuoka, Japan

[73] Assignee: Kabushiki Kaisha Kawasaki Giken, Kukuoka-ken, Japan

[21] Appl. No.: 841,370

[22] Filed: Apr. 30, 1997

[30] Foreign Application Priority Data

Dec. 6, 1996 [JP] Japan ................................. 8-357467

[51] Int. Cl.$^6$ .................................................. B01D 46/00
[52] U.S. Cl. ................................. 95/17; 95/19; 95/273; 95/288
[58] Field of Search ............................. 95/273, 288, 289, 95/17, 18, 19; 55/267, 268, 341.1

[56] References Cited

U.S. PATENT DOCUMENTS

| | | | |
|---|---|---|---|
| 3,395,512 | 8/1968 | Finney Jr. et al. | |
| 3,607,034 | 9/1971 | Henry | 55/267 |
| 3,884,162 | 5/1975 | Schuster | 55/267 |
| 4,454,100 | 6/1984 | Faatz | 95/288 |
| 4,582,122 | 4/1986 | Fan | 55/267 |
| 4,862,813 | 9/1989 | Levin et al. | 55/267 |
| 4,905,614 | 3/1990 | Grigel et al. | 95/288 |
| 5,050,508 | 9/1991 | Wilson | 55/267 |
| 5,516,975 | 5/1996 | Takazawa | 55/267 |

FOREIGN PATENT DOCUMENTS

| | | | |
|---|---|---|---|
| 2027365 | 12/1971 | Germany | 55/267 |
| 53-1680 | 1/1978 | Japan | 95/288 |
| 4-260408 | 9/1992 | Japan | 55/267 |
| 6-170139 | 6/1994 | Japan | 55/267 |
| 2060418 | 5/1981 | United Kingdom | 95/288 |

*Primary Examiner*—Duane S. Smith
*Attorney, Agent, or Firm*—Edwin E. Greigg; Ronald E. Greigg

[57] ABSTRACT

In a method of removing dioxins in a waste incineration plant for cooling combustion gases from an incinerator by means of a first and/or second heat exchangers, and for exhausting the gases into the atmosphere through a dust collector of a bag-filter. The method comprises the steps of controlling a temperature of the gases right after the first heat exchanger within a range of 200° C.~140° C., by use of the first heat exchanger, and also controlling a pressure loss of the gases right after the first heat exchanger within a range of $-20$ mmH$_2$O~$-60$ mmH$_2$O.

8 Claims, 6 Drawing Sheets

METHOD OF REMOVING DIOXINS IN A WASTE INCINERATION PLANT

BACKGROUND OF THE INVENTION (1) Field of the Invention

The present invention relates to a method of dioxins in a waste incineration plant which treats by way of incineration a large amount of waste such as general garbage typified by municipal waste.

(2) Prior Art

Change of life style due to economical growth or concentration of population in cities, general garbage typified by municipal waste has increased greatly. For treating the waste, a waste incineration plant is built and designed not only for incinerating the waste, but also for utilizing waste incineration heat for producing steam in order to use the steam directly or for an electric generator.

However, environmental pollution caused by harmful materials included in soot and smoke, particularly dioxins, has brought on a problem. To solve the problem, a dust collector is provided for all of the waste incineration plants. As the dust collector, a bag-filter type, for example, which is superior in an efficiency of dust collection, is becoming used more frequesntly.

The waste incineration plant as mentioned above, is constructed as follows. Namely, the combustion gases in the incinerator is first cooled down to a temperature of about 400° C. in a manner of water spray in a cooling chamber which is located at an exit of the incinerator, and further secondly cooled to a temperature of about 300° C. by means of a first heat exchanger for exchanging the heat of the gases with the air for combustion for the incinerator by utilizing the exhaust gases. Furthermore, the gases are introduced to the dust collector after the gases are cooled at a temperature of about 200° C.~220° C., considering heat resistance of the bag-filter of the dust collector, by means of a second heat exchanger, which is provided these days for preventing production of white smoke. Also, it is substantially the same manner that a boiler is used as the first heat exchanger.

Before the dust collector, slaked lime is sometimes sprayed into the gases as one of the means for removing harmful gases, in order to have dioxins absorbed or adhered to the reacted compounds such as SOX, hydrogen chloride, etc., so that they may be filtered by the dust collector.

It is known from a number of cases and experiments that dioxins are recompounded in the dust collector when the temperature of the gases at the entrance of the dust collector becomes about 300° C., so that emission of dioxins is clearly observed even after the dust collector.

From the fact, it is understood that it is preferable to control the temperature of the gases at the entrance of the dust collector to be about at 200° C.~220° C., in order to prevent formation of dioxins.

It becomes possible to control exhaust of dioxins to a large extent by provision of such a bag-filter type of dust collector, but it is the present situation that the guide lines at the end of 1990 of the Ministry of Health and Welfare, providing the exhaust value of dioxins to be less than 0.5 ng/m$^3$, are not met. It is further expected these days to control the exhaust value to be less than 0.1 ng/m$^3$, as in Europe, and therefore it is required to take severe measures of preventing production of dioxins.

Research is ongoing in order to meet the above-mentioned guide lines, and such research is roughly divided into two fields.

① A research for increasing efficiency of removing dioxins by utilizing a bag-filter, namely a research on how to filter and remove produced dioxins efficiently. It is known that the bag-filter is the best as one of the means for removing dust and harmful materials.

② A research on formation itself of dioxins, coming to grips with the mechanism of formation or of recomposition of dioxins, in order to find how to control formation of dioxins.

In the above-mentioned field of item ① above, the research is directed to a capacity of bag-filter and in view of its limit the research is also directed to chemical materials such as active carbon or some chemical agents used in combination with active carbon, which materials utilize chemical reactions or adsorption.

Further, in the above-mentioned field of item ② above, this includes a fundamental problem of solving the mechanism of production of dioxins, but it is in a half way of solving the mechanism. Therefore, it is common knowledge in this field of the art that it still necessitates a lot of time to control production of dioxins in the direction of the field of item ② above.

In view of these circumstances, it is the actual state that the research is directed to the way of increasing the removing efficiency in order to immediately achieve the required removing efficiency in the above-mentioned guide lines.

The inventor first recognized, while studying solutions along the above-mentioned two directions on the basis of the data of the actual waste incineration plants, that a dust collector of a bag-filter type was the best as a dust collector, considering some conditions such as an efficiency of combustion of a whole of the incineration plant and an efficiency of dust collection. Therefore, the inventor reached a conclusion that the research of removing dioxins should be continued on the basis of using the bag-filter type of dust collector which was already practiced in this field.

Then, the inventor made an effort in continuing the research for using active carbon or chemical agents with the active carbon, utilizing adsorption or chemical reaction, but was not able to find the good result that met the above-mentioned guide lines for removing dioxins.

In view of the circumstances, the inventor has taken a step in another view in order to elucidate the difficult mechanism of formation or recompound of dioxins, as referred to in the item ② above, but not directly face the difficult theme. Namely, the inventor thought that he may find a way of breaking the impasse of the research so far by progressing the research in a viewpoint that under what kinds of conditions dioxins are formed. Fortunately, it is possible to collect the data and the experience from the several waste incineration plants which the inventor belongs to, and so the inventor has been engrossed in the the research on this basis.

SUMMARY OF THE INVENTION

An object of the present invention is to control discharge of dioxins to be minimum so as to meet the level of discharge required by the above-mentioned guide lines, without addition of chemical agents or provision of any special implements.

To achieve the above object, the present invention has taken the following means.

Namely, in a method of removing dioxins in a waste incineration plant for cooling combustion gases from an incinerator by means of a first heat exchanger for heating air for combustion, and for exhausting the gases into the atmosphere through a dust collector of a bag-filter type, the said method comprises the steps of controlling a temperature of the gases right after the first heat exchanger within a range of 200° C.~140° C., by means of the first heat exchanger, and controlling a pressure loss of the gases right after the first heat exchanger within a range of −20 mmH$_2$O~−60 mmH$_2$O.

In the present invention, it is preferable that the temperature of the gases right after the first heat exchanger is controlled within a range of 170° C.~150° C., by means of the first heat exchanger and also controlling a pressure loss of the gases right after the first heat exchanger within a range of −20 mmH$_2$O~−40 mmH$_2$O.

In the present invention, where the combusion gases are cooled by a first heat exchanger for heating air for combustion and a second heat exchanger for heating air for preventing generation of white smoke, the said method comprises the steps of controlling a temperature of the gases right after the first heat exchanger within a range of 350° C.~300° C., by means of the first heat exchanger, controlling a temperature of the gases right after the second heat exchanger within a range of 200° C.~140° C., by means of the second heat exchanger, and controlling a pressure loss of the gases right after the first heat exchanger within a range of −20 mmH$_2$O~−60 mmH$_2$O.

In this case, it is preferable to control the pressure loss of the gases right after the first heat exchanger within a range of −20 mmH$_2$O~−40 mmH$_2$O.

Further, where the combustion gases from the incinerator is cooled by the first heat exchanger as a steam boiler, the method comprises the same steps of controlling a temperature of the gases, which gases go through the first heat exchanger within a range of 200° C.~140° C., and also controlling a pressure loss of the gases right after the first heat exchanger within a range of −20 mmH$_2$O~−60 mmH$_2$O.

As the means for minimizing the pressure loss in comparison with the conventional method, the present invention may take a manner which minimizes a load of dust pile by using conventional means such as a shaking type, reverse air type or pulse jet type, and may construct the first heat exchanger to have a small pressure loss.

According to the present invention, it has obtained a very high efficiency of removing dioxins by the dust collector of a bag-filter type by controlling the vapor phase of dioxins to be lowered in such a manner that the pressure loss and the temperature of the combustion gases right after the first (second) heat exchanger are set to be small values that are remote far away from those in the conventional art.

Other advantages of the present invention will be apparent from the description of the embodiments with reference to the drawings.

BRIEF DESCRIPTION OF THE DRAWINGS

The drawings show embodiments of a method of removing dioxins in a waste incineration plant according to the present invention in which.

DETAILED DESCRIPTION OF THE EMBODIMENTS

The embodiments of the present invention will be described in detail with reference to the drawings.

Considering an efficiency of removing dioxins by a dust collector of a bag-filter type, the inventor analyzed the data of a relationship between vapor pressure and temperature which have a great influence on the vapor phase of dioxins, since it is a very important element as to whether or not dioxins are existent in vapor phase.

Figure 2:
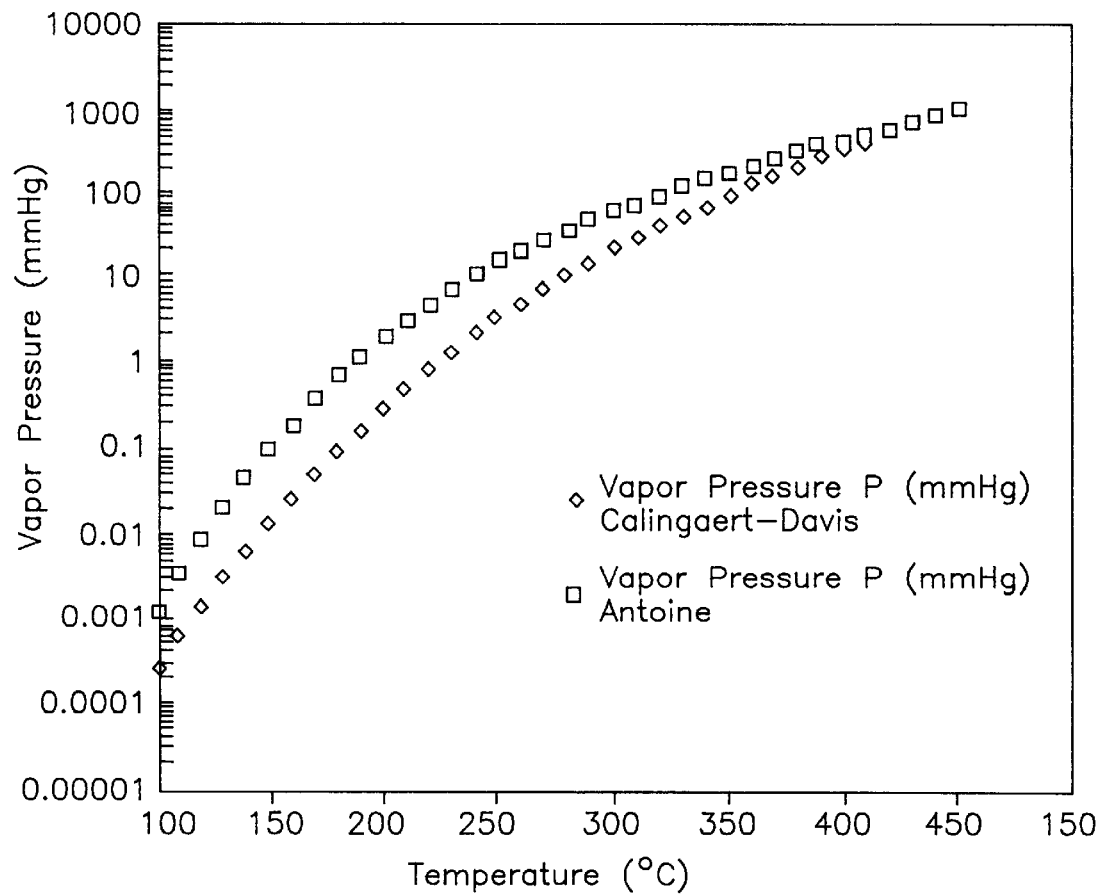
FIG. 2 is another graph for explaining the method of removing dioxins in the waste incineration plant according to the present invention.

Analysis is made particularly on the data of the relationship between the vapor pressure and the temperature of the dioxins of tetra chloro diobenzo -p- dioxin, and the result is shown in FIG. 2. In expressing the result in FIG. 2, well known methods used in chemistry, both Calingart-Davis and Antonie methods are used, but only the Calingart-Davis method is adopted in this embodiment.

Figure 1:
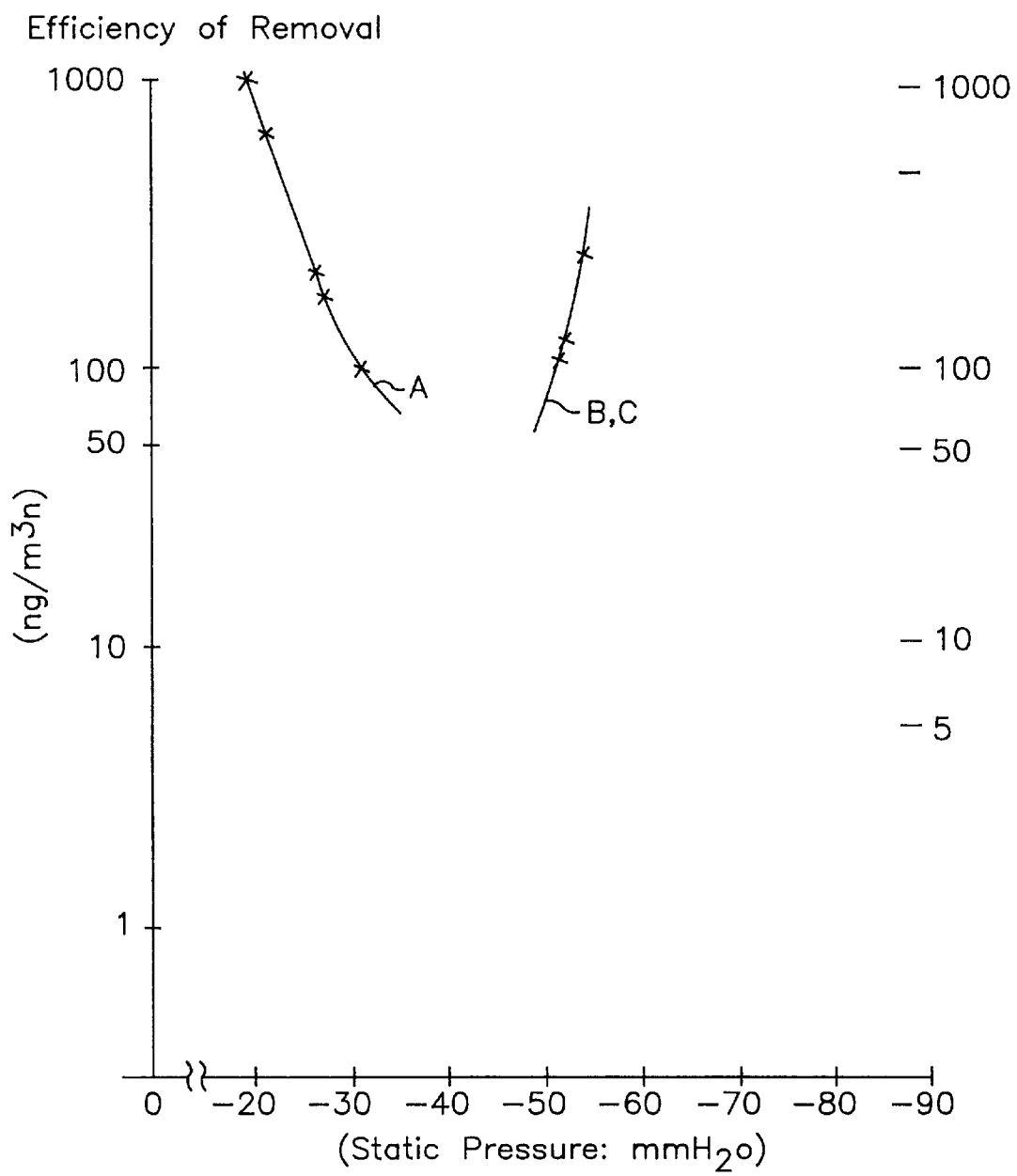
FIG. 1 is a graph for explaining the method of removing dioxins in the waste incineration plant according to the present invention.
Figure 3:
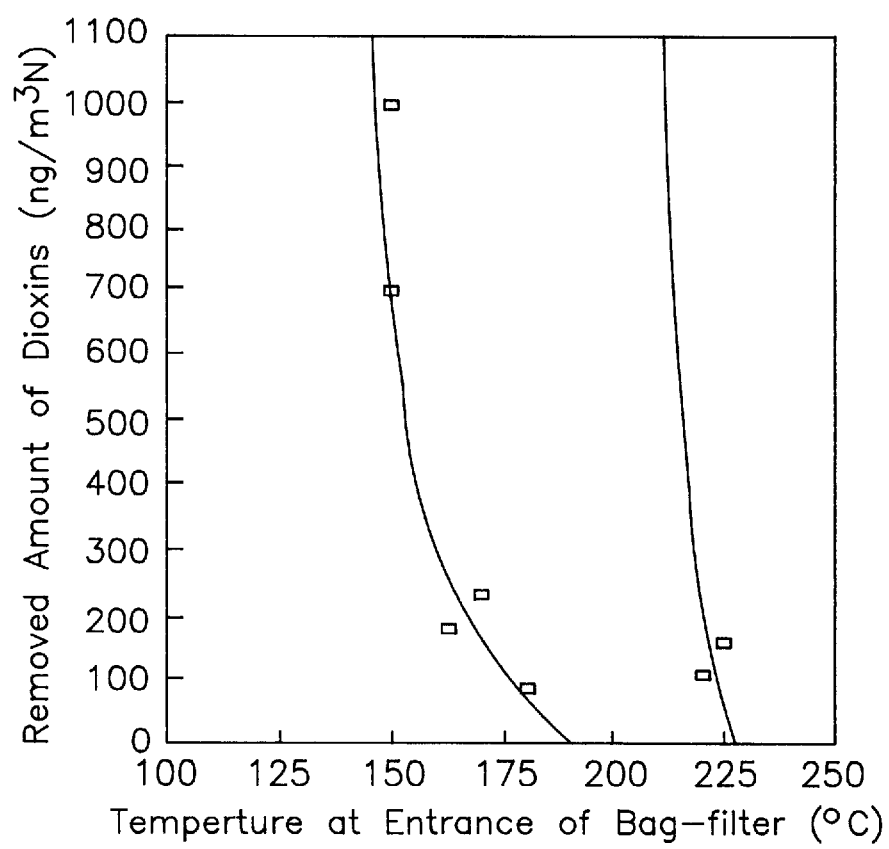
FIG. 3 is still another graph for explaining the method of removing dioxins in the waste incineration plant according to the present invention.
Figure 4:
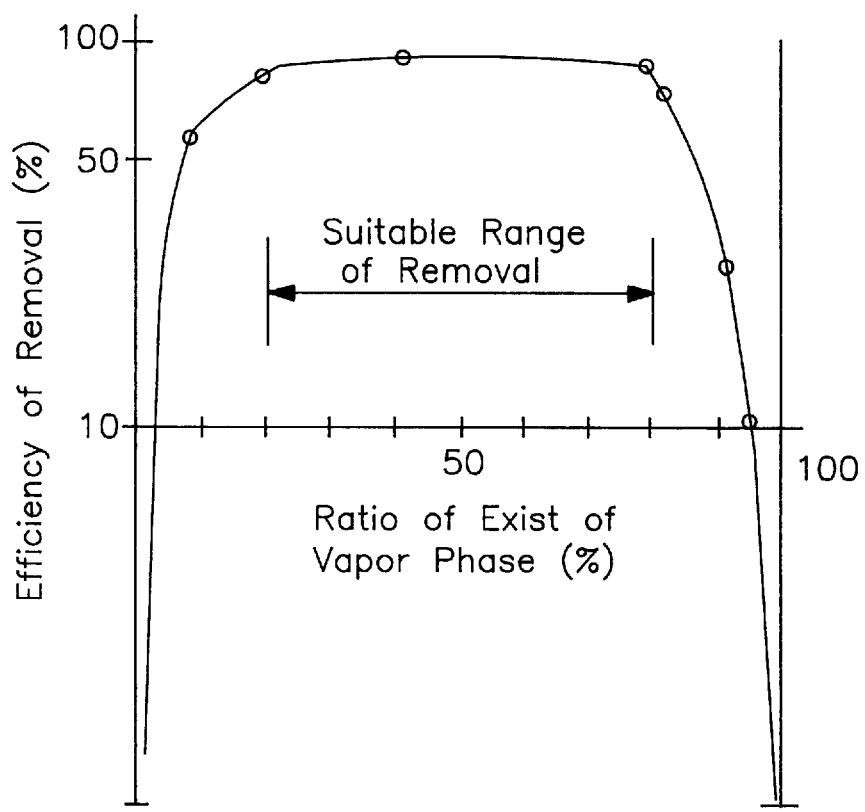
FIG. 4 is still another graph for explaining the method of removing dioxins in the waste incineration plant according to the present invention.

Next, analysis is made on the data of an amount of dioxins removed from the conventional waste incineration plant in which the gas temperature at the entrance of the dust collector is set at 220° C.~225° C., but its pressure loss of the dust collector is varied within a predetermined range. The result shows, as seen with the curve in FIG. 3, that the amount of removal is 100~200 ng/m$^3$N, and as seen with the curve at the right side in FIG. 1, that the pressure loss is −50 mmH$_2$O~−60 mmH$_2$O.

Now, the removal efficiency of dioxins measured in each of the three dust incineration plants A~C, which are actually under operation, is shown in the following tables.

In this table, the "DX" stands for dioxin and dibenzofuran, and its concentration is shown in total. B.F. means the "bag-filter" of the dust collector and the "S.P. bef. B.F." has substantiall the same meaning of the static pressure before the bag-filter or the pressure loss at the entrance of the dust collector. The "Con." stands for concentration.

The definition of sort of the vapor phase and the solid phase is that the solid phase is those which are caught by a cylindrical paper filter which may catch 99.9 percents of the dust having a diameter of more than 0.3 μm, and that the vapor phase is those which pass the filter.

These expression and abbreviation are also cited in each of the following tables.

Plant-A

TABLE 1

|  | S.P. bef. B.F. | Temp.bef. B.F. | Con. of DX bef. B.F. | Con. of DX after B.F. | Per. of Removal |
| --- | --- | --- | --- | --- | --- |
| DX in solid | −30 mmAq | ≈215° C. | 143 | 1.6 | 98.9% |
| DX in gases | −30 mmAq | ≈215° C. | 130 | 117 | 10.0% |

Plant-A is provided with a single heat exchanger.

Plant-B

TABLE 2

|  | S.P. bef. B.F. | Temp.bef. B.F. | Con. of DX bef. B.F. | Con. of DX after B.F. | Per. of Removal |
|---|---|---|---|---|---|
| DX in solid | −40 mmAq −50 mmAq | ≈150° C. | 221 | 3.33 | 98.4% |
| DX in gases | −40 mmAq −50 mmAq | ≈150° C. | 880 | 85 | 90.0% |

Plant-C

TABLE 3

|  | S.P. bef. B.F. | Temp.bef. B.F. | Con. of DX bef. B.F. | Con. of DX after B.F. | Per. of Removal |
|---|---|---|---|---|---|
| DX in solid | −50 mmAq −60 mmAq | ≈147° C. | 57 | 0.7 | 98.8% |
| DX in gases | −40 mmAq −60 mmAq | ≈147° C. | 250 | 58 | 76.8% |

Thus, it becomes possible to grasp the relationship among the predetermined temperature, the pressure loss of the bag-filter of the dust collector and the amount of removal of dioxins.

Figure 5:
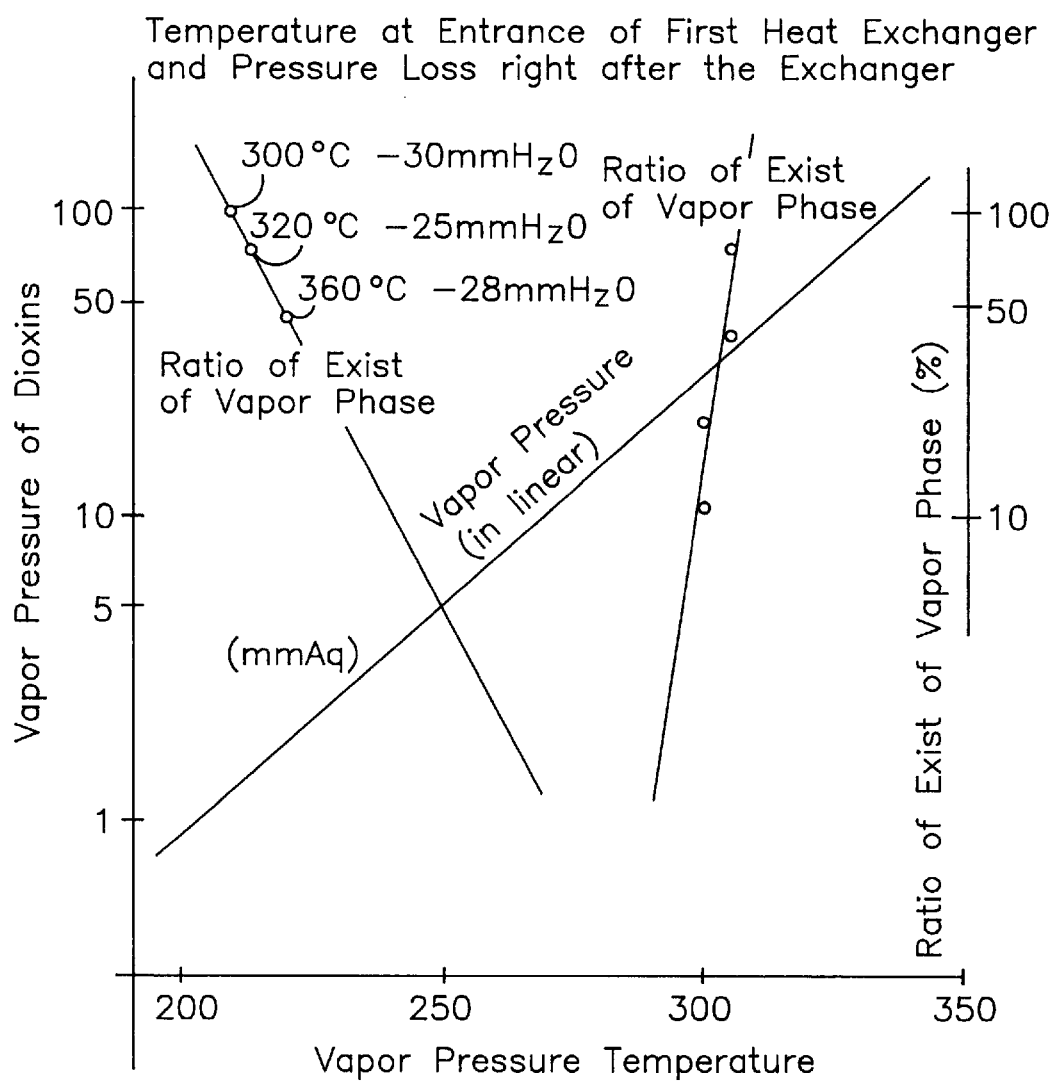
FIG. 5 is still another graph for explaining the method of removing dioxins in the waste incineration plant according to the present invention.

Next, analysis is made on the relationship between the amount of removal of dioxins and a ratio of vapor phase to solid phase, which is very important in removing dioxins of vapor phase. From the standpoint that the removal efficiency of dioxins should be more than at least 90% calculation is made to find the level of the ratio of the vapor phase of dioxins at which the removal efficienct of 90% can be achieved. The relationship between an amount of removal of dioxins and a ratio of vapor phase to solid phase, is shown in the graph of FIG. 5. In short, where the ratio of vapor phase is within a range of 20%~80% (suitable removal range), the removal effficiency reaches about 90%.

FIG. 5 shows the relationship between vapor pressure (mmAq) and a ratio of vapor phase in respective temperatures and static pressures.

Then, the inventor studied and alnalyzed the results, and presumes that the removal efficiency of dioxins is very closely connected to the temperature of the gases at the entrance of the dust collector and the pressure loss. On the basis of the presumption, the inventor has tried to vary the construction of the first heat exchanger (as a heater for combustion air) to make it large-scaled, so as to gradually change the pressure loss of the conventional waste incineration plant to −20 mmH$_2$O~−60 mmH$_2$O, and to increase a cooling efficiency of the gases to change the temperature thereof at the entrance of the dust collector to 200° C.~140° C. The test data are collected and shown by the curves in the left side of each of FIGS. 1 and 3. The result shows that it becomes possible to obtain a very high removal efficiency of dioxins.

As shown in these test data, it is made clear that a very good removal efficiency can be obtained when the pressure loss at the entrance of the dust collector is set in a range of −20 mmH$_2$O~−40 mmH$_2$O, and the temperature of the gases is set in a range of 170° C.~150° C.

Figure 6:
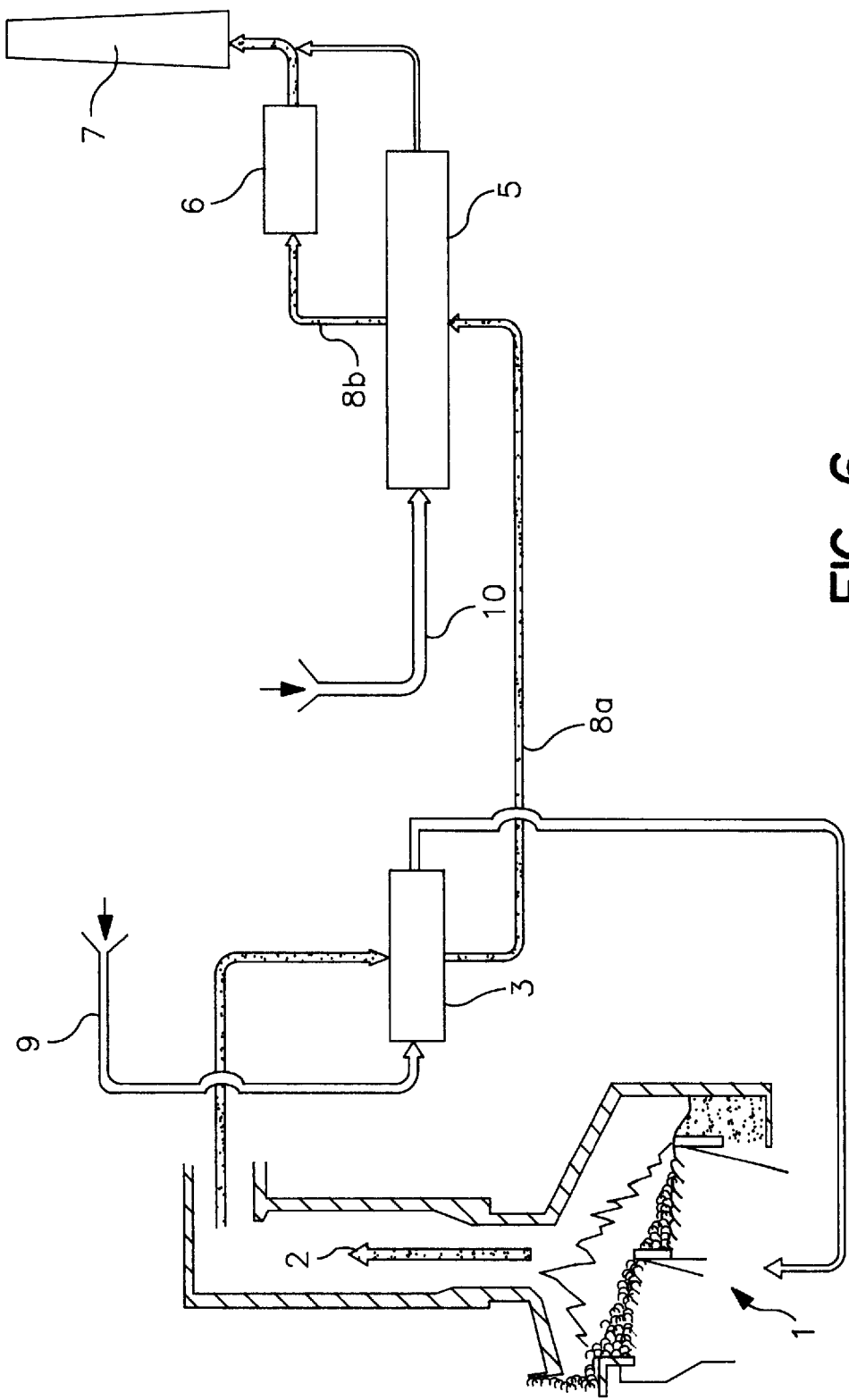
FIG. 6 is a brief flow chart of an incineration plant according to the present invention.

FIG. 6 is a brief flow chart of the incineration plant. The numeral 1 is an incinerator in which waste is burnt. The numeral 2 shows exhaust gases, which is generated in the incinerator 1. The exhause gases 2 are cooled by a first heat exchanger 3, which heats an air 9 for combustion in the incinerator in advance. The exhaust gases 2 after the first exchanger is introduced to a dust collector of a bag-filter type 6 and then discharged from a chimney 7.

As shown with imaginary lines (two dotted lines), where a second heat exchanger 5 is provided for heating an air 10 in order to prevent generation of white smoke by using the heated air 10, the exhaust gases 2 is utilized again after the first heat exchanger. In such a plant, a pre-heater may somtimes be provided before the second heat exchanger 5 for pre-heating the air by using the heated air 9.

The numeral 8a and 8b show the points where the present invention picked up the data.

The present invention will be modified and worked in accordance with the essentail idea of taking the values of the pressure loss and temperature which are referred to in the above mentioned embodiments.

The foregoing relates to a preferred exemplary embodiment of the invention, it being understood that other variants and embodiments thereof are possible within the spirit and scope of the invention, the latter being defined by the appended claims.

What is claimed is:

1. In a method of removing dioxins in a waste incineration plant for cooling combustion gases from an incinerator by means of a first heat exchanger for heating air for combustion, and for exhausting the gases into the atmosphere through a dust collector of a bag-filter, the said method comprising the steps of:

controlling a temperature of the gases right after the first heat exchanger within a range of 200° C.~140° C., by means of the first heat exchanger, and also controlling a pressure loss of the gases right after the first heat exchanger within a range of −20 mmH$_2$O~−60 mmH$_2$O.

2. A method of claim 1, which comprises controlling the temperature of the gases right after the first heat exchanger within a range of 170° C.~150° C., by means of the first heat exchanger and also controlling the pressure loss of the gases within a range of −20 mmH$_2$O~−40 mmH$_2$O.

3. In a method of removing dioxins in a waste incineration plant for cooling combustion gases from an incinerator by means of a first heat exchanger for heating air for combustion and a second heat exchanger for heating air for preventing generation of white smoke, and for exhausting the gases into the atmosphere through a dust collector of a bag-filter, the said method comprising the steps of:

controlling a temperature of the gases right after the first heat exchanger within a range of 350° C.~300° C., by means of the first heat exchanger, controlling a temperature of the gases right after the second heat exchanger within a range of 200° C.~140° C., by means of the second heat exchanger, and controlling a pressure loss of the gases right after the first heat exchanger within a range of −20 mmH$_2$O~−60 mmH$_2$O.

4. The method of claim 3, which comprises controlling the pressure loss of the gases right after the first heat exchanger within a range of −20 mmH$_2$O~−40 mmH$_2$O.

5. In a method of removing dioxins in a waste incineration plant for cooling combustion gases from an incinerator by means of a steam boiler as a first heat exchanger, and for exhausting the gases into the atmosphere through a dust collector of a bag-filter, the said method comprising the steps of:

controlling a temperature of the gases right after the first heat exchanger within a range of 200° C.~140° C., by means of the first heat exchanger, and controlling a pressure loss of the gases right after the first heat exchanger within a range of −20 mmH$_2$O~−60 mmH$_2$O.

6. The method of claim 2 wherein the dioxins are tetra chloro diobenzo -p- dioxin.

7. The method of claim 4 wherein the dioxins are tetra chloro diobenzo -p- dioxin.

8. The method of claim 5 wherein the dioxins are tetra chloro diobenzo -p- dioxin.

* * * * *